(12) United States Patent
Beming et al.

(10) Patent No.: US 6,236,646 B1
(45) Date of Patent: May 22, 2001

(54) PACKET DATA COMMUNICATIONS SCHEDULING IN A SPREAD SPECTRUM COMMUNICATIONS SYSTEM

(75) Inventors: Per Beming, Stockholm; Mathias Johansson, Sollentuna; Johan Lundsjö, Bromma; Christiaan Roobol, Hässelby, all of (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 08/926,047

(22) Filed: Sep. 9, 1997

(51) Int. Cl.$^7$ ...................................................... H04J 13/02
(52) U.S. Cl. .......................................... 370/335; 370/342
(58) Field of Search .................................... 370/329, 335, 370/336, 337, 342, 341, 479, 348, 349; 455/509, 510, 517

(56) References Cited

U.S. PATENT DOCUMENTS

| | | | |
|---|---|---|---|
| 5,640,395 | * 6/1997 | Hamalainen et al. | 370/322 |
| 5,793,744 | * 8/1998 | Kanerva et al. | 370/209 |
| 5,828,662 | * 10/1998 | Jalali et al. | 370/320 |
| 5,926,501 | * 7/1999 | Souissi et al. | 375/200 |
| 6,018,528 | * 1/2000 | Gitlin et al. | 370/436 |
| 6,072,784 | * 6/2000 | Agrawal et al. | 370/311 |
| 6,091,717 | * 7/2000 | Honkasalo et al. | 370/329 |

FOREIGN PATENT DOCUMENTS

| | | |
|---|---|---|
| 0765096 | 3/1997 | (EP) . |
| 2278977 | 12/1994 | (GB) . |
| 2297460 | 7/1996 | (GB) . |
| WO 93/15573 | 8/1993 | (WO) . |

OTHER PUBLICATIONS

European Patent Office, Standard Search Report RS100211, Mar. 4, 1998.

\* cited by examiner

*Primary Examiner*—Melvin Marcelo
(74) *Attorney, Agent, or Firm*—Jenkens & Gilchrist (57) ABSTRACT

In a spread spectrum communications system supporting bursty uplink and downlink data packet transmission telecommunications services, significant concerns exist as to the generation of unacceptable levels of interference resulting from plural and simultaneous data packet transmissions. To address this concern, the system selectively organizes an access schedule for mobile station uplink data packet transmissions and a delivery schedule for downlink data packet transmissions. For the uplink, the schedule is transmitted to plural mobile stations in a current frame, and identifies which one or ones of plural mobile stations are authorized to make an uplink data packet transmission in a next frame. Only those mobile stations scheduled with authorization to make an access in the next frame then transmit their data packets (or a portions thereof) to the base station during that next frame. On the downlink, a notification of intended delivery is communicated to destination mobile stations in a current frame. The system then makes downlink delivery in accordance with the schedule to the destination mobile stations in a next frame.

33 Claims, 3 Drawing Sheets

PACKET DATA COMMUNICATIONS SCHEDULING IN A SPREAD SPECTRUM COMMUNICATIONS SYSTEM

BACKGROUND OF THE INVENTION

1. Technical Field of the Invention

The present invention relates to mobile communications systems and, in particular, to a system for scheduling uplink and downlink communications access for packet data communications.

2. Description of Related Art

The next generation of mobile communications systems (comprising, for example, wideband cellular systems) will be required to provide a broad selection of telecommunications services including digital voice, video significantly. This may result in much higher traffic density on the limited communications resources of the system.

In a spread spectrum (code division multiple access) type wideband cellular system, each mobile station has access to its own set of uplink code channels for use in supporting use of the available telecommunications services. These sets of uplink codes between mobile stations, however, due to synchronization concerns, are not experienced as being orthogonal to each other. Accordingly, interference to a limited degree occurs between mobile stations when plural mobile stations simultaneously engage in call communications. In spite of efforts to dynamically control transmit power levels, and thus control interference, this experienced interference may rise to an unacceptable level as an increasingly large number of mobile station calls are processed.

The foregoing interference problem is of special concern in connection with the provision of packet data telecommunications services on the uplink. This is because the traffic being handled by the communications system tends to be very bursty in nature and it is very difficult to predict service access. If a significant number of these uplink bursts occur simultaneously, interference between mobile stations may rise to a sufficient level to impair or block successful communications transmission, not only for the data telecommunications service, but possibly for other telecommunications services as well. There is a need then for a system and method for scheduling mobile station access to the uplink for the purpose of making a packet data communications transmission.

Furthermore, similar concerns exist with respect to interference caused by bursty downlink packet data communications transmissions to mobile station. Thus, there is also a need for a system and method for scheduling base station access to the downlink for the purpose of making a packet data communications transmission.

SUMMARY OF THE INVENTION

Responsive to a mobile station request to make an uplink data packet transmission, a telecommunications system grants the mobile station transmission access. A schedule for authorized mobile station access to make an uplink data packet transmission in a next frame is then determined by the system, with that schedule transmitted from the base station to plural mobile stations, including the requesting mobile station, in a current frame. Each mobile station scheduled with authorization to make an access in the next frame then transmits its data packet (or a portion thereof) to the base station during that next frame. The system, in selectively organizing the access schedule for mobile station data packet transmissions on a per frame basis, effectively exercises control over when mobile stations may make uplink communications and thus controls the level of interference generated by multiple mobile station transmissions.

With respect to the downlink, the telecommunications system determines a schedule for the transmission of data packets by a base station to served mobile stations. In accordance with this schedule, the base station transmits a notification in a current frame to a destination mobile station that a data packet is about to be delivered in a next frame. Responsive thereto, the mobile station access the appropriate code channel and receives the message in the next frame.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
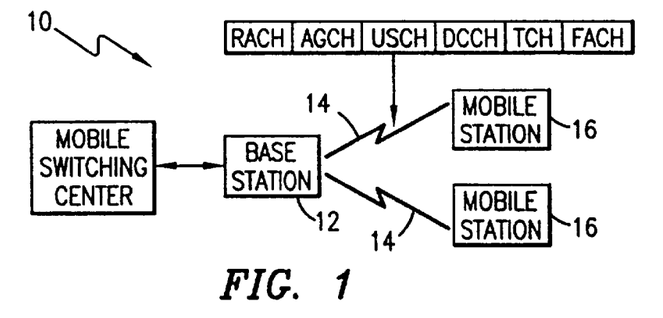
FIG. 1 is a schematic block diagram of a cellular communications system.

Reference is now made to FIG. 1 wherein there is shown a schematic block diagram of a cellular communications system 10 providing a spread spectrum (code division multiple access) type wideband cellular communications service. The system 10 comprises a base station 12 in communication over an air interface 14 with a plurality of mobile stations 16. Although a broad selection of telecommunications services including digital voice, video and data (in both packet and channel-switched modes) are supported by the system 10 using communications carried over the air interface 14, the present invention focuses solely on the provision of data telecommunications services.

The air interface 14 supports a number of logical channels that are mapped into one or more physical channels. In the data telecommunications service context of the present invention, the logical channels of importance comprise the random access channel (RACH), the access grant channel (AGCH), the uplink scheduling channel (USCH), the dedicated control channel (DCCH), the forward access channel (FACH), and the mobile station code channel (also referred to as a traffic channel, and hereinafter identified by TCH). The random access channel is the logical channel on which a mobile station 16 makes a random uplink access, using a random access (RA) message, to the system 10. The access grant channel is the logical channel on which the system 10 authorizes, using an access grant (AG) message, a scheduled (i.e., not-random) uplink access by the mobile station 16 on a given code channel. The uplink scheduling channel is the logical channel on which the system 10 indicates, in an uplink scheduling (US) message, the frame timing (i.e., the schedule) authorized for the mobile station 16 to make the uplink access. The forward access channel is the logical channel on which the system indicates, in a downlink delivery (DD) message, that a data packet delivery is about to be made to a mobile station. The dedicated control channel is the logical channel that may alternatively be used for communication of the RA, AG, US and DD messages, in order to reduce complexity, when the mobile station 16 is simultaneously making use of a telecommunications service in addition to the packet data service. Lastly, the mobile station code (traffic) channel comprises the logical channel over which the mobile station 16 makes or receives a packet data transmission.

Figure 2:
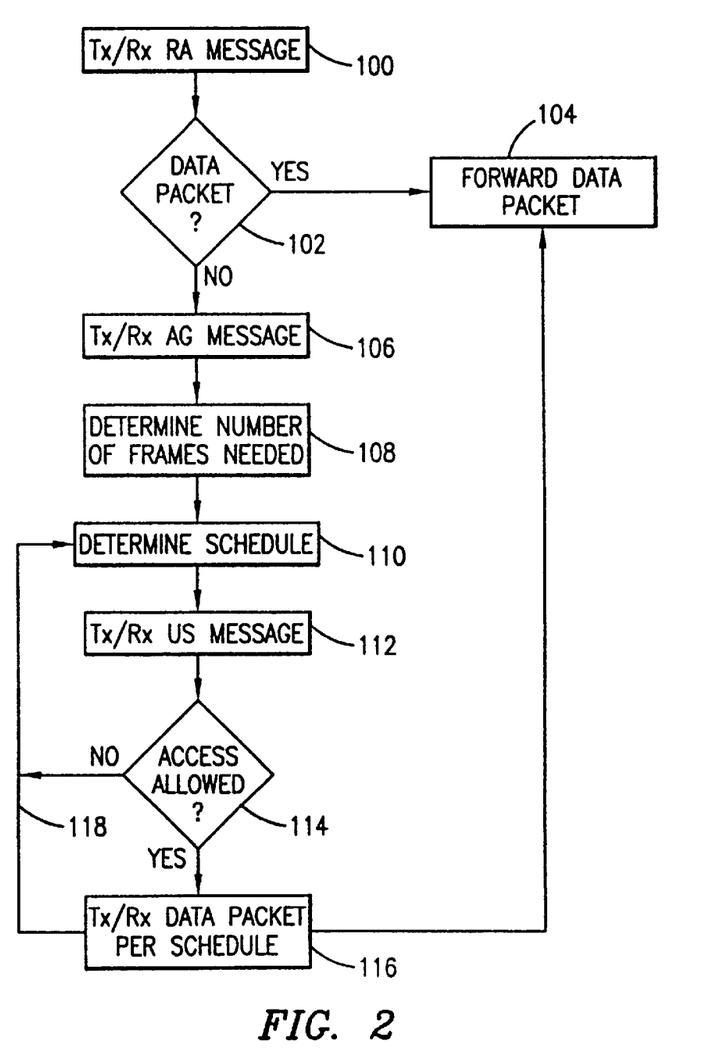
FIG. 2 is a flow diagram illustrating the uplink packet data scheduling process of the present invention.

Reference is now made in combination to FIGS. 1 and 2, wherein FIG. 2 is a flow diagram illustrating the uplink packet data scheduling process of the present invention. Suppose a mobile station 16 desires to transmit a data packet. The mobile station 16 first transmits (TX) a random access (RA) message over the random access channel (RACH) to the base station 12 (step 100). As an alternative, the random access message may be sent over the dedicated control channel (DCCH) in instances where the mobile station 16 is simultaneously making use of a telecommunications service in addition to the packet data service. The random access message includes either: the data packet itself (if it is short); or, an indication of the length of the data packet the mobile station 16 desires to send. If the random access message includes the data packet itself (as determined in step 102), once received (RX) by the base station 12, the system simply forwards the data packet (step 104) on to its destination. Otherwise, responsive to receipt of the random access message, the base station 12 transmits an access grant (AG) message to the mobile station 16 over the access grant channel (AGCH) (step 106). Again, the access grant message may be sent over the dedicated control channel, and further, in instances of soft handoff, may be sent from plural base stations. The access grant message includes information identifying the uplink mobile station code (traffic) channel (TCH) to be used for transmitting the data packet, and the downlink channel where the uplink scheduling channel (USCH) is located. The access grant message may further include information identifying the time (i.e., frame location) when the mobile station is authorized to make a data packet transmission. A determination is then made by the system as to the number of frames needed to transmit the mobile station data packet (step 108), and a schedule of authorized mobile station accesses for a next frame is determined (step 110). Responsive to receipt of the access grant message, the mobile station 16 accesses the uplink scheduling channel, and receives in a transmitted uplink scheduling (US) message the frame timing (i.e., the schedule of times in an upcoming frame or frames) authorized for the mobile station to make one or more uplink accesses to transmit the data packet (step 112). This uplink scheduling message may further include information processing gain (spreading factor) that the mobile station should use in making its uplink communication. Transmission of the processing gain information with each scheduling message allows the system to exercise dynamic control of the processing gains used by the individual mobile stations. Again, the uplink scheduling message may be sent over the dedicated control channel, and further, in instances of soft handoff, may be sent from plural base stations. The action of step 112 for mobile station accessing of the uplink scheduling channel to receive the uplink scheduling message may occur once each frame, or alternatively may occur whenever needed. This uplink scheduling message may further specifically contain information identifying which of the plural served mobile stations are allowed to make uplink data packet transmissions starting in a next frame. If the mobile station 16 is allowed (as indicated by the received uplink scheduling message) to make an uplink data packet transmission in the next frame (decision step 114) in accordance with the schedule, the access grant message specified uplink mobile station code (traffic) channel (TCH) is accessed, the appropriate processing gain used, and the data packet (or a portion thereof) is transmitted in that next frame (step 116) for subsequent base station reception. Alternatively, all of the data packet is sent (using as many subsequent frames as are needed) starting with that next frame (step 116). If no access is allowed in the frame, or if only a portion of the data packet was transmitted in that frame, the process then returns in loop 118 to step 110 to schedule mobile station access, again receive the uplink scheduling message, and determine in step 112 whether a remaining portion of the data packet may be transmitted in a next following frame. The looping 118 is performed for the requisite number of frames determined in step 108 that are needed to complete data packet transmission. No looping 118 is required if the complete data packet is transmitted starting with the next frame. Once the data packet is completely received by the base station, the system forwards the data packet (step 104) on to its destination.

Figure 3:
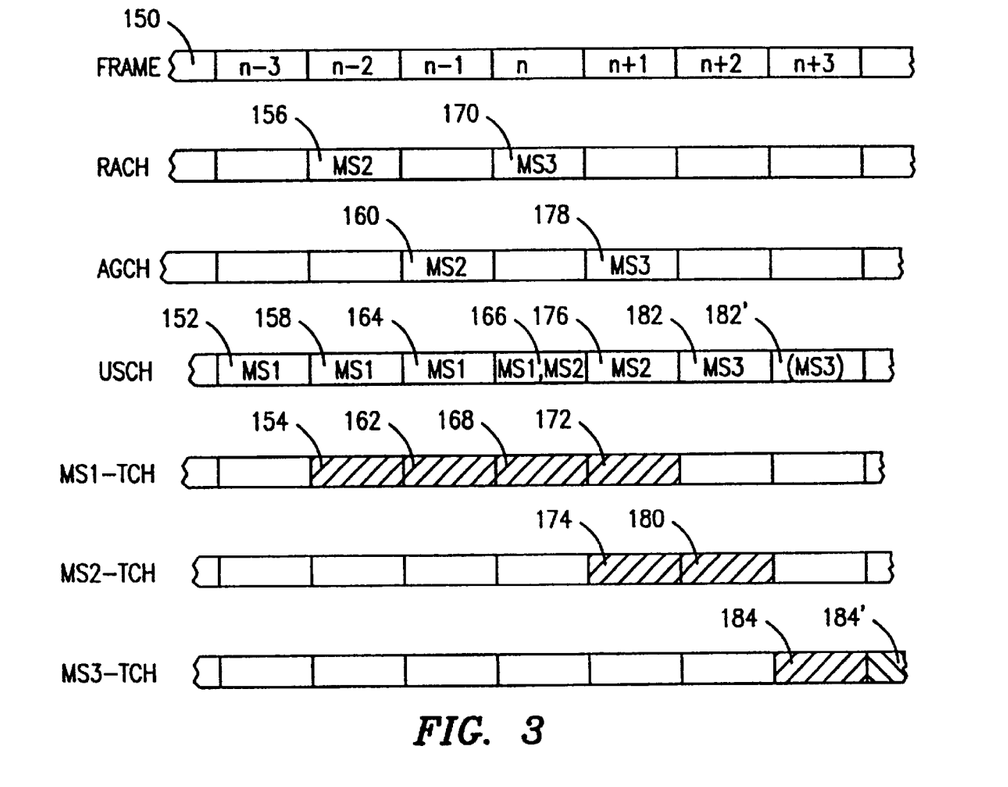
FIG. 3 is a frame scheduling diagram illustrating operation of the process of FIG. 2.

Reference is now made to FIG. 3 wherein there is shown a frame scheduling diagram illustrating operation of the process of FIG. 2. Communications over various logical channels of the air interface in the system of FIG. 1 occur in frames 150. A number of sequential frames 150 labeled n–3 to n+3 are shown in FIG. 3. Furthermore, the random access channel (RACH), access grant channel (AGCH) and uplink scheduling channel (USCH) logical channels of the air interface are also illustrated. Lastly, the uplink data packet mobile station code (traffic) channels (TCHs) for three mobile stations (MS1, MS2 and MS3) are shown.

At frame n–3, none of the mobile station are engaging in an uplink data packet transmission. However, as indicated at 152, a base station uplink scheduling message is being transmitted over the uplink scheduling channel. The transmitted message includes information identifying that mobile station MS1 is being authorized to make uplink data packet transmissions in a next frame (i.e., frame n–2).

Moving on then to frame n–2, the mobile station MS1 transmits its data packet (or a portion thereof) as indicated at 154 to the base station. Also, mobile station MS2 sends a random access (RA) message over the random access channel (RACH) as indicated at 156 to the base station. This message includes an identification of the length of a data packet mobile station MS2 desires to send. Furthermore, as indicated at 158, the uplink scheduling channel comprises a base station uplink scheduling message transmission including information identifying that mobile station MS1 continues to be authorized to make uplink data packet transmissions in a next frame (i.e., frame n–1).

Turning now to frame n–1, responsive to receipt of the random access message from mobile station MS2, the base station transmits an access grant message on the access grant channel (AGCH) to mobile station MS2 as indicated at 160. The access grant message includes information identifying the uplink mobile station code (traffic) channel (MS2-TCH) to be used for transmitting the data packet, and the downlink channel where the uplink scheduling channel (USCH) is located. The mobile station MS1 further continues to transmit its data packet (or a portion thereof) as indicated at 162 to the base station. Furthermore, as indicated at 164, the uplink scheduling channel comprises a base station uplink scheduling message transmission including information identifying that mobile station MS1 continues to be authorized to make uplink data packet transmissions in a next frame (i.e., frame n).

Moving on now to frame n, the system has determined, from the identified length of the data packet mobile station MS2 desires to send, the number of frames 150 needed to transmit the data packet. Assume for this example that two frames are needed. A base station uplink scheduling message is then transmitted, as indicated at 166, over the uplink scheduling channel including information identifying that mobile station MS1 continues to be authorized to make uplink data packet transmissions in a next frame (i.e., frame n+1), and further that mobile station MS2 is being authorized to make uplink data packet transmissions in a next frame (i.e., frame n+1). The mobile station MS1 further continues to transmit its data packet (or a portion thereof) as indicated at 168 to the base station. Also, mobile station MS3 sends a random access (RA) message over the random access channel (RACH) as indicated at 170 to the base station.

In frame n+1, the mobile station MS1 finishes its continued transmission of its data packet (or a portion thereof) as indicated at 172 to the base station. Furthermore, the mobile station MS2 initiates the transmission of its data packet (comprising a first portion thereof) as indicated at 174 to the base station. A base station uplink scheduling message is also transmitted, as indicated at 176, over the uplink scheduling channel including information identifying that mobile station MS2 continues to be authorized to make uplink data packet transmissions in a next frame (i.e., frame n+2). Also, responsive to receipt of the random access message from mobile station MS3, the base station transmits an access grant message on the access grant channel (AGCH) to mobile station MS3 as indicated at 178. The access grant message includes information identifying the uplink mobile station code (traffic) channel (MS3-TCH) to be used for transmitting the data packet, and the downlink channel where the uplink scheduling channel (USCH) is located.

At frame n+2, the mobile station MS2 finishes its continued transmission of its data packet (or a portion thereof) as indicated at 180 to the base station. The system has further determined, from the identified length of the data packet mobile station MS3 desires to send, the number of frames 150 needed to transmit the data packet. Assume for this example that one frame is needed. A base station uplink scheduling message is then transmitted, as indicated at 182, over the uplink scheduling channel including information identifying that mobile station MS3 is being authorized to make an uplink data packet transmission in a next frame (i.e., frame n+3).

In frame n+3, the mobile station MS3 initiates and completes its transmission of its data packet as indicated at 184 to the base station.

As each mobile station uses its own set of spreading codes for these data packet transmissions on the mobile station code (traffic) channel (TCH), it is possible for several mobile stations to simultaneously transmit all or portions of their respective data packets. This is illustrated in frame n+1 at 172 and 174 where both mobile station MS1 and mobile station MS2 have been authorized by the base station transmitted uplink scheduling message to simultaneously make data packet transmissions on their respective code channels. Furthermore, the system may selectively choose which one or ones of the plural mobile station should be granted authorization in the transmitted uplink scheduling message to make a data packet transmission in the next frame. By selectively choosing authorized access, the system effectuates control over the communications load carried on the air interface. Thus, some control over interference may be made by intelligently organizing and scheduling mobile station accesses on the code channel to engage in bursty data packet transmissions. This is illustrated frames n+2 and n+3. As discussed above, the base station transmits in frame n+2 an uplink scheduling message, as indicated at 182, over the uplink scheduling channel including information identifying that mobile station MS3 is being authorized to make an uplink data packet transmission 184 in a next frame (i.e., frame n+3). If, on the other hand, the system recognized that a mobile station MS3 uplink data packet transmission in frame n+3 would result in unacceptable levels of interference, perhaps due to other (not shown) simultaneous uses, the system could intelligently manage (i.e., schedule) access for data packet transmission and instead send the uplink scheduling message, as indicated at 182', over the uplink scheduling channel in frame n+3 to grant mobile station MS3 authorization for an uplink data packet transmission 184' in a later frame. The scheduling and management functions being performed in accordance with the present invention are implemented either in the base station or in the mobile switching center of the system of FIG. 1.

Figure 4:
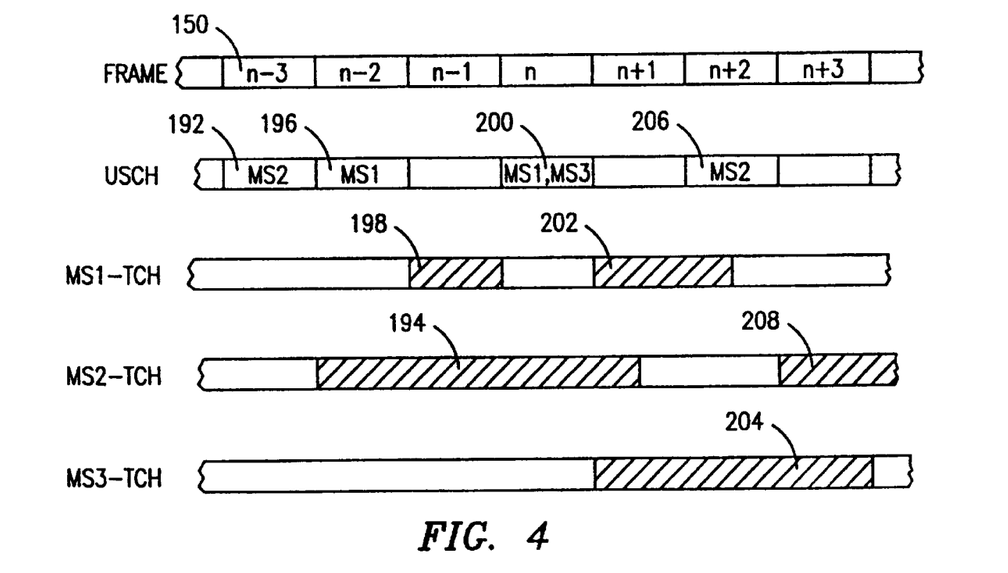
FIG. 4 is an alternative embodiment frame scheduling diagram illustrating operation of the process of FIG. 2.

Reference is now made to FIG. 4 wherein there is shown an alternative embodiment frame scheduling diagram illustrating operation of the process of FIG. 2. Again, a number of sequential frames 150 labeled n−3 to n+3 are shown in FIG. 4. To simplify this illustration, however, only the uplink scheduling channel (USCH), and the uplink data packet mobile station code (traffic) channels (TCHs) for three mobile stations (MS1, MS2 and MS3) of the air interface are shown. No explicit discussion of the random access message transmission, evaluation, scheduling, or access grant message transmission operation is provided (see, FIG. 3).

At frame n−3, none of the mobile station are engaging in an uplink data packet transmission. However, as indicated at 192, a base station uplink scheduling message transmission is being made on the uplink scheduling channel, the message transmission including information identifying that mobile station MS2 is being authorized to make uplink data packet transmissions in an upcoming frame or frames. In this specific instance the authorization is made for transmission starting in a next frame (i.e., frame n−2) and lasting for as many frames as are needed to complete the transmission. This differs then from the embodiment of FIG. 3 wherein authorization is given in the uplink scheduling message for transmission in only the next frame. In this simplified illustration, it is assumed that the mobile station MS2 has already made its random access, a determination has been made by the system as to the number frames needed for the transmission, a schedule for transmission has been determined, and the access grant message has been sent.

Moving on then to frame n−2, the mobile station MS2 starts transmission of its data packet as indicated at 194 to the base station. This transmission 194 will continue for a duration of a little more that three frames 150. Also, as indicated at 196, the uplink scheduling channel comprises a base station uplink scheduling message transmission including information identifying that mobile station MS1 is authorized to make uplink data packet transmissions in a next frame (i.e., frame n−1). Again, it is assumed that the mobile station MS1 has already made its random access, a determination has been made by the system as to the number frames needed for the transmission, a schedule for transmission has been determined, and the access grant message has been sent.

Turning now to frame n−1, the mobile station MS2 continues with its data packet transmission 194. Furthermore, the mobile station MS1 starts and completes transmission of its data packet as indicated at 198 to the base station.

Moving on now to frame n, the mobile station MS2 continues with its data packet transmission 194. Also, as indicated at 200, the uplink scheduling channel comprises a base station uplink scheduling message transmission including information identifying that mobile station MS1 and mobile station MS3 are authorized to each make uplink data packet transmissions in an upcoming frame or frames and, in particular, starting in a next frame (i.e., frame n+1). Again, it is assumed that the mobile stations MS1 and MS3 have already made their random accesses, determinations have been made by the system as to the number frames needed for each transmission, a schedule for the transmissions has been determined, and the access grant messages have been sent.

In frame n+1, the mobile station MS1 starts transmission of its data packet as indicated at 202 to the base station. This transmission 202 will continue for a duration of a little more than one frame 150. Also, the mobile station MS3 starts transmission of its data packet as indicated at 204 to the base station. This transmission 204 will continue for a duration of three frames 150. Lastly, the mobile station MS2 completes its data packet transmission 194.

At frame n+2, the mobile station MS1 completes its data packet transmission 202. Furthermore, the mobile station MS3 continues with its data packet transmission 204. Also, as indicated at 206, the uplink scheduling channel comprises a base station uplink scheduling message transmission including information identifying that mobile station MS2 is authorized to make uplink data packet transmissions in an upcoming frame or frames and, in particular, starting in a next frame (i.e., frame n+3). Again, it is assumed that the mobile station MS2 has already made its random access, a determination has been made by the system as to the number frames needed for the transmission, a schedule for transmission has been determined, and the access grant message has been sent.

In frame n+3, the mobile station MS3 completes its data packet transmission 204. Also, the mobile station MS2 starts transmission of its data packet as indicated at 208 to the base station. This transmission 208 will continue for a duration of at least one frame 150.

Figure 5:
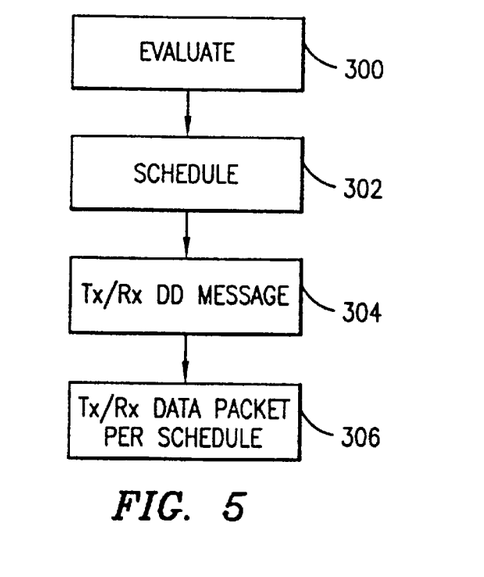
FIG. 5 is a flow diagram illustrating the downlink packet data scheduling process of the present invention.

Reference is now made in combination to FIGS. 1 and 5, wherein FIG. 5 is a flow diagram illustrating the downlink packet data scheduling process of the present invention. Suppose the system 10 desires to transmit a data packet to a particular mobile station 16. The system first evaluates the downlink data packet in the context of current downlink loading in step 300. This evaluation may include consideration of the number of frames needed to make the transmission. Next, the system schedules the downlink transmission in with other downlink transmissions (step 302). Then, at appropriate frame instances, a downlink delivery message is transmitted (step 304) over the forward access channel (FACH) by the base station during a current frame over the air interface to the destination mobile station for the data packet. As an alternative, the downlink delivery message may be sent over the dedicated control channel (DCCH) in instances where the mobile station 16 is simultaneously making use of a telecommunications service in addition to the packet data service. In this context, it is understood that multiple ones of the downlink delivery messages may be simultaneously sent to plural destination mobile stations (for corresponding plural data packet transmissions). Each message includes an indication not only that a downlink delivery is to made starting in a next frame, but also of the code channel the destination mobile station should access to receive the delivery. The message may further include processing gain (spreading factor) information for use by the mobile station in receiving the downlink communication. Transmission of the processing gain information with each indication message allows the system to exercise dynamic control of the processing gains used by the individual mobile stations. A transmission is then made in the next frame by the base station, for mobile station reception, of each frame scheduled data packet (step 306).

Figure 6:
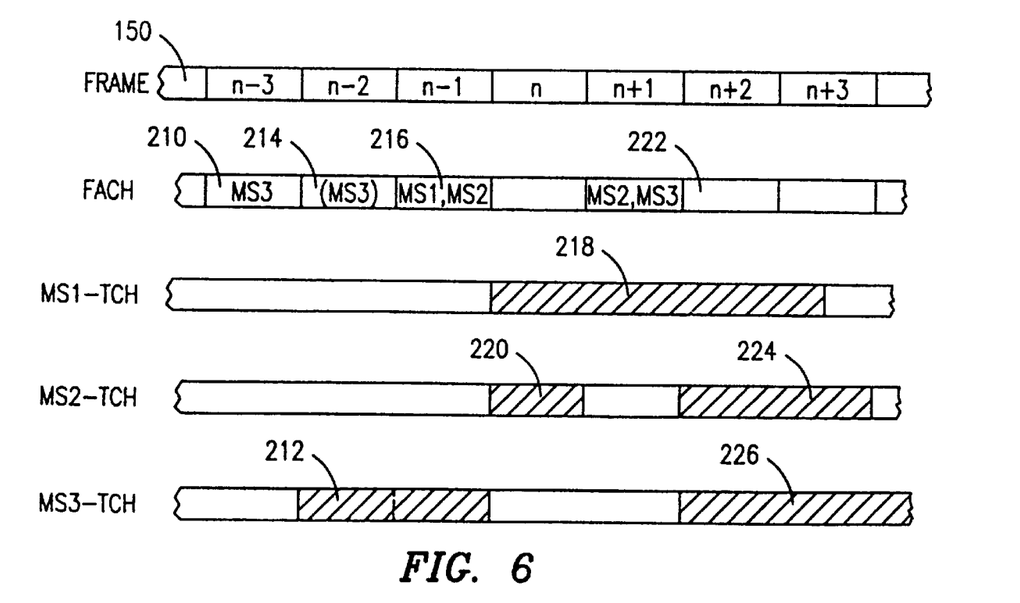
FIG. 6 is a frame scheduling diagram illustrating operation of the process of FIG. 5.

Reference is now made to FIG. 6 wherein there is shown a frame scheduling diagram illustrating operation of the process of FIG. 5. Again, a number of sequential frames 150 labeled n−3 to n+3 are shown in FIG. 6. With respect to downlink scheduling, this illustration makes use of the forward control channel (FACH), and the downlink data packet mobile station code (traffic) channels (TCHs) for three mobile stations (MS1, MS2 and MS3) of the air interface.

At frame n−3, none of the mobile station are receiving a downlink data packet transmission. However, as indicated at 210, a downlink delivery message transmission is being made on the forward control channel. This message transmission includes information identifying that mobile station MS3 is being informed of an upcoming downlink data packet transmission starting in a next frame (i.e., frame n−2). The information may be specific for only the next frame (compare to uplink process illustrated in FIG. 3), or indicate that the transmission will last for as many frames as are needed to complete the transmission (compare to uplink process illustrated in FIG. 4). In this simplified illustration, it is assumed that the system has already received the data packet for mobile station MS3, has evaluated downlink loading conditions, and appropriately determined the schedule for transmission.

Moving on then to frame n−2, the system starts transmission of the data packet as indicated at 212 to the mobile station MS3. In one embodiment, this transmission 212 will continue for a duration of two frames 150. In another embodiment, it may continue into the second frame if another downlink delivery message is sent to mobile station MS3 in frame n−2 (as indicated at 214).

Turning now to frame n−1, the system completes delivery of the downlink data packet transmission 212 to mobile station MS3. Furthermore, a downlink delivery message transmission is being made on the forward control channel as indicated at 216. This message transmission includes information identifying that mobile stations MS1, and MS2 are being informed of upcoming downlink data packet transmissions each starting in a next frame (i.e., frame n). In this simplified illustration, it is assumed that the system has already received the data packets for mobile stations MS1 and MS2, has evaluated downlink loading conditions, and appropriately determined the schedule for transmission.

Moving on now to frame n, the system starts transmission of the data packets as indicated at 218 and 220 to the mobile stations MS1 and MS2, respectively. The transmission 218 to mobile station MS1 will continue for a duration of a little more than three frames 150. The transmission 220 to mobile station MS2, on the other hand, lasts for only one frame 150.

In frame n+1, the transmission 218 continues. Furthermore, a downlink delivery message transmission is being made on the forward control channel as indicated at 222. This message transmission includes information identifying that mobile stations MS2 and MS3 are being informed of upcoming downlink data packet transmissions each starting in a next frame (i.e., frame n+2). In this simplified illustration, it is assumed that the system has already received the data packets for mobile stations MS2 and MS3, has evaluated downlink loading conditions, and appropriately determined the schedule for transmission.

At frame n+2, the transmission 218 continues. Furthermore, the system starts transmission of the data packets as indicated at 224 and 226 to the mobile stations MS2 and MS3, respectively. The transmission 224 to mobile station MS2 will continue for a duration of two frames 150. The transmission 226 to mobile station MS3, on the other hand, will last for a duration of at least two frames 150.

As each mobile station uses its own set of spreading codes for receiving these data packet transmissions on the downlink mobile station code (traffic) channel (TCH), it is possible for several data packets to be simultaneously transmitted by the system to plural mobile stations. This is illustrated in several instances in FIG. 6. Furthermore, the system may selectively choose which one or ones of the data packets should be transmitted to the plural mobile stations in each frame. By selectively choosing downlink transmission, the system effectuates control over the communications load carried on the air interface. Thus, some control over interference may be made by intelligently organizing and scheduling downlink transmissions to mobile stations with respect to the bursty data packet transmissions. If the system recognizes that a mobile station downlink data packet transmission in a certain frame would result in unacceptable levels of interference, perhaps due to other (not shown) simultaneous uses, the system could intelligently manage (i.e., schedule) that downlink data packet transmission for a different frame. The scheduling and management functions being performed in accordance with the present invention are implemented either in the base station or in the mobile switching center of the system of FIG. 1.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A spread spectrum communications system, comprising:
   a plurality of mobile stations, certain ones of those mobile stations having data packets for uplink communication; and
   a base station in radio frequency communication over a spread spectrum air interface with the plurality of mobile stations, the base station responding to access requests from the certain ones of the mobile stations by scheduling frame access for the uplink communication of data packets, the schedule communicated on the downlink over the air interface to the mobile stations in a current frame, the schedule identifying which of the certain mobile stations have authorization to make spread coded, uplink data packet communications over the air interface in a next frame and the schedule further including mobile station processing gain (spreading factor) assignments to allow the base station to dynamically control bandwidth allocated to the mobile stations in making uplink data packet communications in the next frame.

2. The system as in claim 1 wherein the spread spectrum communications system comprises a code division multiple access cellular communications system.

3. The system as in claim 1 wherein the schedule is communicated over the air interface on a control channel.

4. The system as in claim 3 wherein the control channel comprises a common downlink control channel for mobile stations used for scheduling uplink traffic.

5. The system as in claim 3 wherein the control channel comprises a control channel dedicated to a mobile station.

6. The system as in claim 1 wherein the access requests from the certain mobile stations are transmitted over a common uplink control channel used for accessing the system.

7. The system as in claim 1 wherein the access requests from the certain mobile stations are transmitted over an uplink control channel dedicated to the mobile station.

8. The system as in claim 1 wherein the access requests from the certain mobile stations include an indication of a length for the data packet for uplink communication.

9. The system as in claim 1 wherein the schedule further identifies times in an upcoming frame or frames where plural ones of the certain mobile stations have authorization to make simultaneous spread coded, uplink data packet communications over the air interface.

10. A method for use in a spread spectrum communications system for scheduling uplink communications access, comprising the steps of:
    receiving from plural mobile stations access request messages each indicative of a desire to make an uplink data packet communication;
    scheduling, in response to the received access request messages, frame access for the uplink communication of data packets;
    transmitting from a base station on the downlink during a current frame a schedule identifying which one or ones of the certain mobile stations have authorization to make spread coded, uplink data packet communications in a next frame, the schedule further including mobile station processing gain (spreading factor) assignments to allow the base station to dynamically control the amount of bandwidth allocated to the mobile stations in making uplink data packet communications in the next frame; and
    receiving the spread coded, uplink data packet communications from the schedule authorized mobile stations.

11. The method as in claim 10 wherein the spread spectrum communications system comprises a code division multiple access cellular communications system.

12. The method as in claim 10 wherein the step of transmitting the schedule comprises the step of transmitting the schedule on a spread spectrum communications system control channel.

13. The method as in claim 12 wherein the control channel comprises a common downlink control channel for mobile stations used for scheduling uplink traffic.

14. The method as in claim 12 wherein the control channel comprises a control channel dedicated to a mobile station.

15. The method as in claim 10 wherein the step of receiving the access request messages comprises the step of receiving the access request messages over a common uplink control channel used for accessing the system.

16. The method as in claim 10 wherein the step of receiving the access request messages comprises the step of receiving the access request messages over an uplink control channel dedicated to the mobile station.

17. The method as in claim 10 wherein the step of scheduling further includes the steps of:
    determining a number of frames required for complete communication of each mobile station data packet; and
    accounting in the scheduled frame access for data packet communications requiring multiple frames.

18. The method as in claim 10 wherein the access request messages include an indication of a length for the data packet for uplink communication.

19. The system as in claim 10 wherein the step of transmitting the schedule comprises the step of transmitting the schedule identifying times in an upcoming frame or frames where plural ones of the certain mobile stations have authorization to make simultaneous spread coded, uplink data packet communications.

20. A spread spectrum communications system, comprising:
- a plurality of mobile stations, certain ones of those mobile stations comprising destinations for downlink data packet communications; and
- a base station in radio frequency communication over a spread spectrum air interface with the plurality of mobile stations, the base station responding to receipt of a data packet for downlink communication by scheduling frame access for the downlink communication of data packets, the schedule identifying times in an upcoming frame or frames for the downlink delivery of data packets, the schedule executed to transmit over the air interface to the destination mobile stations an indication of intended delivery and to make spread coded, downlink data packet communications over the air interface at the identified times.

21. The system as in claim 20 wherein the spread spectrum communications system comprises a code division multiple access cellular communications system.

22. The system as in claim 20 wherein the indication is communicated over the air interface on a control channel.

23. The system as in claim 22 wherein the control channel comprises a common downlink control channel for mobile stations used for providing downlink delivery indications.

24. The system as in claim 22 wherein the control channel comprises a control channel dedicated to a mobile station.

25. The system as in claim 20 wherein the schedule is executed to transmit over the air interface to the destination mobile stations an indication during a current frame of intended delivery and to make spread coded, downlink data packet communications over the air interface during a next frame.

26. The system as in claim 25 wherein the indication includes processing gain (spreading factor) information for use by the certain mobile stations in receiving downlink data packet communications.

27. A method for use in a spread spectrum communications system for scheduling downlink communications delivery, comprising the steps of:
- scheduling, in response to a received downlink data packet, frame access for the downlink communication of data packets at certain times in an upcoming frame or frames;
- transmitting an indication to certain one or ones of the mobile stations regarding intended delivery of a downlink data packet communication; and
- transmitting spread coded, downlink data packet communications in accordance with the scheduling to the certain mobile stations.

28. The method as in claim 27 wherein the spread spectrum communications system comprises a code division multiple access cellular communications system.

29. The method as in claim 27 wherein the step of transmitting the indication comprises the step of transmitting the indication on a spread spectrum communications system control channel.

30. The method as in claim 29 wherein the control channel comprises a common downlink control channel for mobile stations used for providing downlink delivery indications.

31. The method as in claim 29 wherein the control channel comprises a control channel dedicated to a mobile station.

32. The method as in claim 27:
- wherein the step of transmitting an indication comprises the step of transmitting during a current frame the indication to the certain mobile stations that a downlink data packet communication is to be delivered in a next frame; and
- wherein the step of transmitting data packet communications comprises the step of transmitting during the next frame the spread coded, downlink data packet communications in accordance with the scheduling to the certain mobile stations.

33. The method as in claim 27 wherein the indication includes processing gain (spreading factor) information for use by the certain mobile stations in receiving downlink data packet communications.

* * * * *

UNITED STATES PATENT AND TRADEMARK OFFICE
CERTIFICATE OF CORRECTION

PATENT NO.    : 6,236,646 B1
DATED         : May 22, 2001
INVENTOR(S)   : Beming et al.

It is certified that error appears in the above-identified patent and that said Letters Patent is hereby corrected as shown below:

<u>Column 1,</u>
Line 16, Replace "video significantly." with -- video and data (in both packet and channel-switched modes). As a direct result of the increased number of services available to the subscriber, the number of calls being made is expected to increase significantly. --

Signed and Sealed this

Fourth Day of February, 2003

JAMES E. ROGAN
*Director of the United States Patent and Trademark Office*